US 6,267,410 B1

(12) United States Patent
Koketsu et al.

(10) Patent No.: US 6,267,410 B1
(45) Date of Patent: Jul. 31, 2001

(54) THROUGH ANCHOR

(75) Inventors: Eiji Koketsu; Naoki Ohashi, both of Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 09/557,610

(22) Filed: Apr. 25, 2000

(30) Foreign Application Priority Data

Apr. 28, 1999 (JP) .................................................. 11-122887

(51) Int. Cl.⁷ .................................................. B60R 22/18
(52) U.S. Cl. ........................ 280/801.1; 280/808; 297/486
(58) Field of Search ................................ 280/801.1, 808; 297/468, 483, 482

(56) References Cited

U.S. PATENT DOCUMENTS 5,257,820 * 11/1993 Kosugi ................................. 280/808
5,513,880 *  5/1996 Ohira ................................... 280/808
5,601,311 *  2/1997 Pfeiffer et al. ..................... 280/801.1
5,918,903 *  7/1999 Ito ...................................... 280/801.1
6,007,100 * 12/1999 Steffens, Jr. ...................... 280/801.1

* cited by examiner

Primary Examiner—Paul N. Dickson
(74) Attorney, Agent, or Firm—Nixon Peabody LLP; Thomas W. Cole

(57) ABSTRACT

A through anchor in which residual stress caused by thermal contraction is dispersed so as to reduce risk of crack formation in a resin molding portion. The through anchor includes a metal plate and a resin molding portion covering a portion of the metal plate. Usually, residual stress due to thermal contraction (shrinkage) differences between the resin molding portion and the metal plate is high in regions near both ends of the boundary between the resin molding portion and the metal plate. A notch portion is formed in each of the regions so as to expose a portion of the outer peripheral portion of the metal plate covered by the resin molding portion to the outside environment. Accordingly, although the resin molding portion thermally contracts after insert molding, the contraction of the resin molding portion is not retarded as much by the outer peripheral portion of the metal plate due to the outer peripheral portion of the metal plate being exposed. As a result, the risk of crack formation in the resin molding portion is reduced in this region.

16 Claims, 6 Drawing Sheets

THROUGH ANCHOR

BACKGROUND OF THE INVENTION

1. Field of the Invention

The present invention relates to a through anchor by which a webbing pulled out from a take-up device is folded and held in a slidable manner.

2. Description of the Related Art

As illustrated in FIG. 5, a three-point type seat belt apparatus 40 is used to safely hold a vehicle occupant in a seat S. One end of a webbing 42 of the seat belt apparatus 40 is taken up by a retractor 44 (take-up device) and another end thereof is fixed via a through anchor 46 to an anchor plate 50 supported at a lower end of a center pillar 48. Further, a tongue plate 52 provided in the webbing 42 between the anchor plate 50 and the through anchor 46 is engaged with a buckle 54 made upright substantially from the central portion of a vehicle body.

The through anchor 46 is used to fold the webbing 42 so as to fix, to the anchor plate 50, an end of the webbing 42 of which another end is taken up by the retractor 44. The through anchor 46 itself is also fixed to the center pillar 48, for example, by an adjuster mechanism which permits height control.

The through anchor 46 is structured as shown in FIG. 6. The through anchor 46 is manufactured by molding in which a metal plate 56 having an insertion hole 45 through which the webbing 42 is inserted to pass is set in a metal mold and resin is put into the metal mold. After the molding, a resin molding portion 58 covers a lower half section of the metal plate 56.

The resin molding portion 58 is formed by putting resin molten at a high temperature into the mold, and thereafter, cooled down. Accordingly, the resin forming portion 58 thermally contracts in the directions indicated by arrow B. In contrast, an insert portion 61 of the metal plate 56 does not typically thermally contract to a significant degree.

As a result, due to a difference in rate of shrinkage between the resin molding portion 58 and the insert portion 61 of the metal plate 56, residual stress is generated between the resin molding portion 58 and the metal plate 56. Particularly, a crack may form in a region A in the vicinity of each end of the resin molding portion 58 along a shoulder 57 of the metal plate 56.

Accordingly, in order to prevent occurrence of a crack, a high-strength material having a low rate of mold shrinkage is conventionally used as the resin molding portion 58 so as to prevent contraction of the resin molding portion 58 caused by residual stress. However, such high-strength materials are expensive.

SUMMARY OF THE INVENTION

In view of the aforementioned, an object of the present invention is to provide a through anchor which allows dispersion of residual stress and can reduce occurrences of cracks in the resin molding portion without using high-strength and/or high-priced materials.

A first aspect of the present invention is a through anchor for a seat belt apparatus for a vehicle, by which webbing pulled out from a retractor is folded and held in a slidable manner, and the through anchor comprises: a metal plate having an insert portion and an exposed portion; a resin molding portion formed by insert molding and covering the insert portion of the metal plate; and a dispersion portion for dispersing residual stress, which is generated between the resin molding portion and the metal plate due to thermal contraction of the resin molding portion caused after insert molding, the dispersion portion being formed in a region in which the residual stress concentrates, wherein the insert portion of the metal plate has an outer peripheral portion and the resin molding portion protrudes beyond the outer peripheral portion by a predetermined amount.

According to the above-described structure, the through anchor is formed by insert molding in which a portion of the metal plate is inserted in a metallic mold and molten resin is injected into the mold, and the metallic mold is subsequently removed.

The resin molding portion is formed in such a manner that resin is molten under high temperature and then cooled. Therefore, after the insert molding, the resin molding portion thermally contracts (shrinks). As a result, residual stress arises due to the differences in shrinkage rate between the resin molding portion and the metal plate, which typically does not thermally contract to a significant degree.

By forming the dispersion portion in the region in which residual stress concentrate, the residual stress is dispersed and problems due to the contraction of the resin molding portion can be alleviated.

In accordance with a second aspect of the present invention, in the through anchor of the first aspect, the dispersion portion includes notch portions formed in vicinities of both ends of a boundary between the resin molding portion and the exposed portion of the metal plate.

According to the above-described structure, the dispersion portion includes notch portions formed in vicinities of opposite ends of the boundary between the resin molding portion and the metal plate. The notch portions expose the metal plate and are each formed in a region in which the residual stress between the resin molding portion and the metal plate tends to concentrate.

When the notch portion is formed in the above-mentioned regions, a portion of the outer periphery of the metal plate, which is conventionally covered with the resin molding portion, is exposed to the outside.

As a result, retardation of contraction of the resin molding portion by the outer periphery of the metal plate is reduced. Accordingly, the risk of crack formation caused due to residual stress from differential shrinkage is significantly reduced.

A third aspect of the present invention is a through anchor for fastening to an interior of a vehicle for supporting seat belt webbing inserted therethrough, the through anchor comprises: a metal fastening portion including a body section having an outer peripheral edge, and a fastening section extending from the body section for fastening to the interior of a vehicle; and a resin molding mounted over the body section, the resin molding having a lip extending past the outer peripheral edge of the body section, with notches defined in the lip and exposing at least a part of the outer peripheral edge of the body section within each notch, wherein a slot is defined through the body section and the resin molding for insertion of seat belt webbing through the slot for supporting the webbing.

DESCRIPTION OF THE PREFERRED EMBODIMENTS

Referring now to the attached drawings, a through anchor according to an embodiment of the present invention will be hereinafter described.

Figure 1:
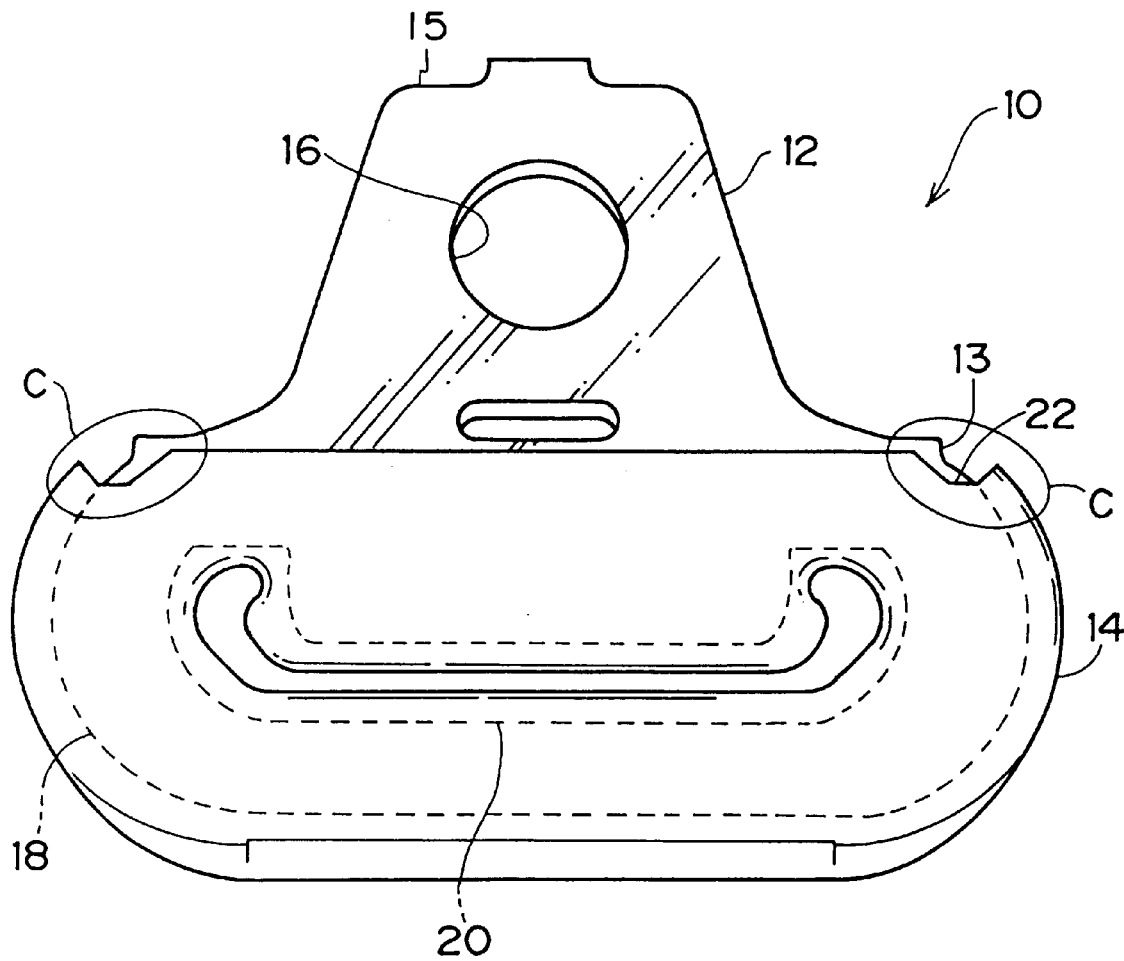
FIG. 1 is a structural diagram of a through anchor according to an embodiment of the present invention.
Figure 2:
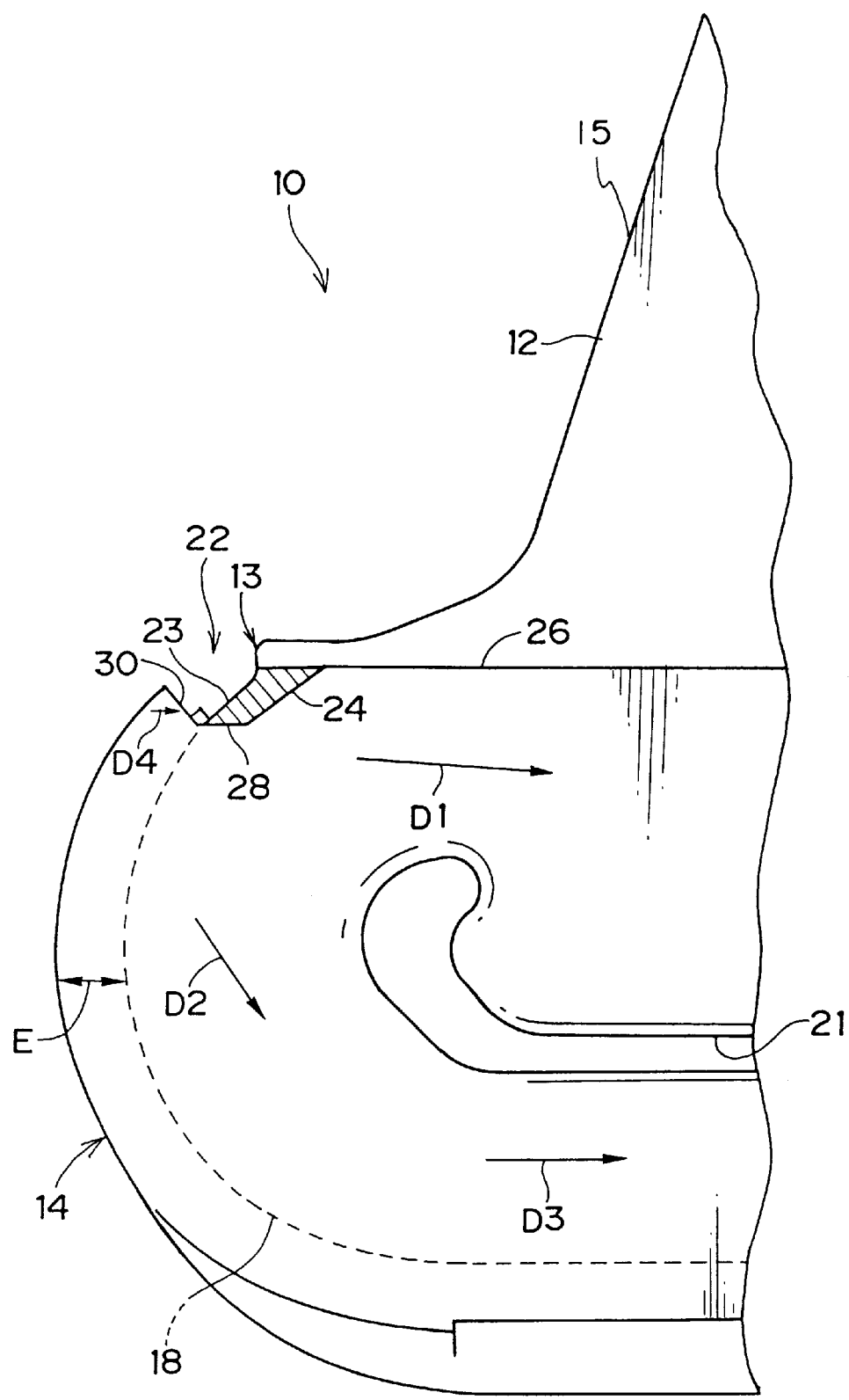
FIG. 2 is an enlarged view of a notch portion formed in the through anchor of the present invention.

As illustrated in FIG. 1, a through anchor 10 of the present invention is formed by a metal plate 12 and the metal plate 12 has an exposed portion 15 and an insert portion 18. Specifically, as shown in FIG. 2, the through anchor 10 also includes a resin molding portion 14 which protrudes from an outer peripheral portion 23 of the metal plate 12 by a predetermined length E so as to cover the insert portion 18 of the metal plate 12. The exposed portion 15 is a region in which a metal surface is exposed, which region is not covered by the resin molding portion of the metal plate 12.

A bolt insertion hole 16 is formed in the exposed portion 15 of the metal plate 12 and a bolt 34 (see FIG. 4) to be fixed to an adjuster mechanism (not shown) in an interior of a vehicle, is provided to pass through the bolt insertion hole 16.

Figure 5:
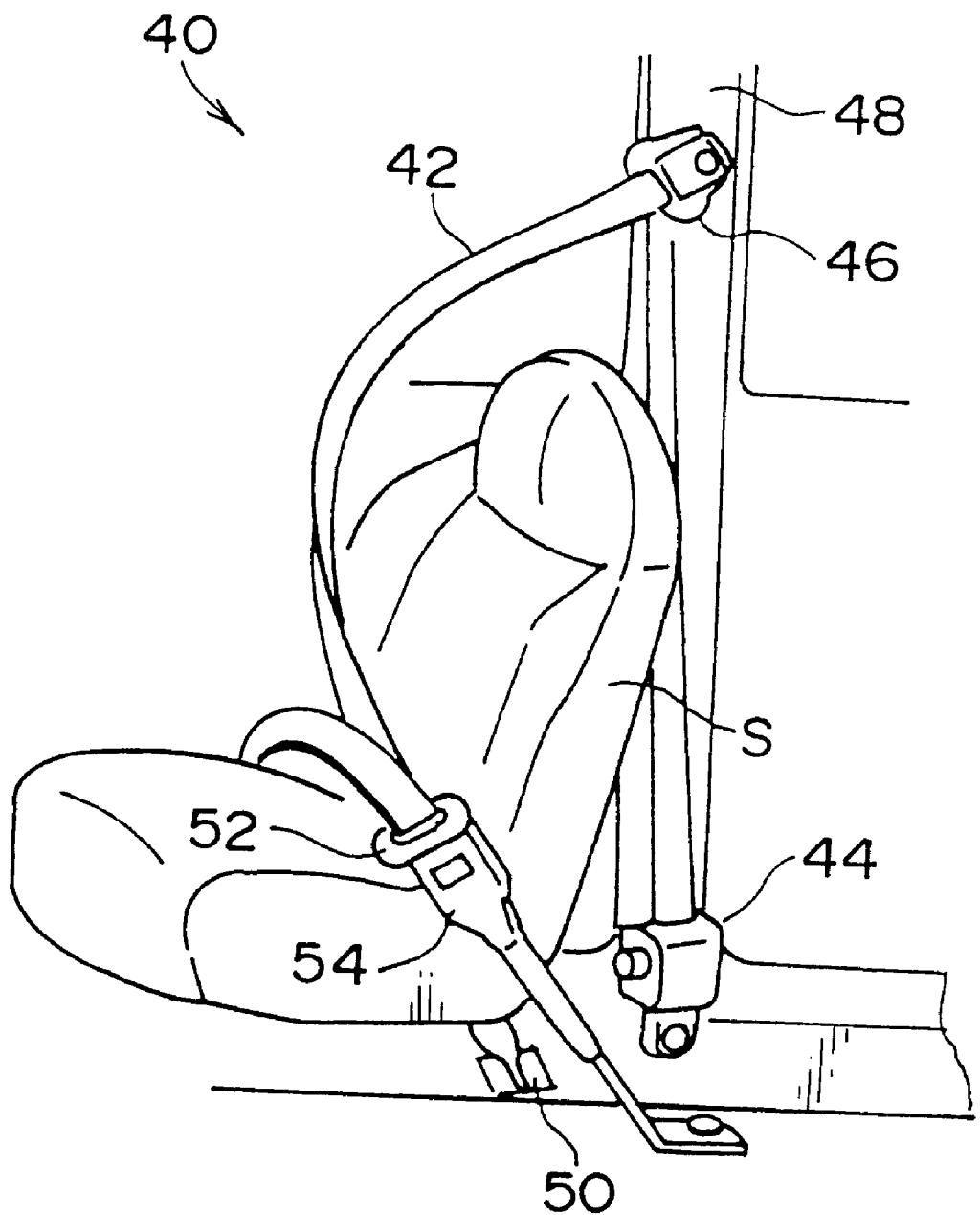
FIG. 5 is a structural diagram of a conventional three-point type seat belt apparatus.
Figure 6:
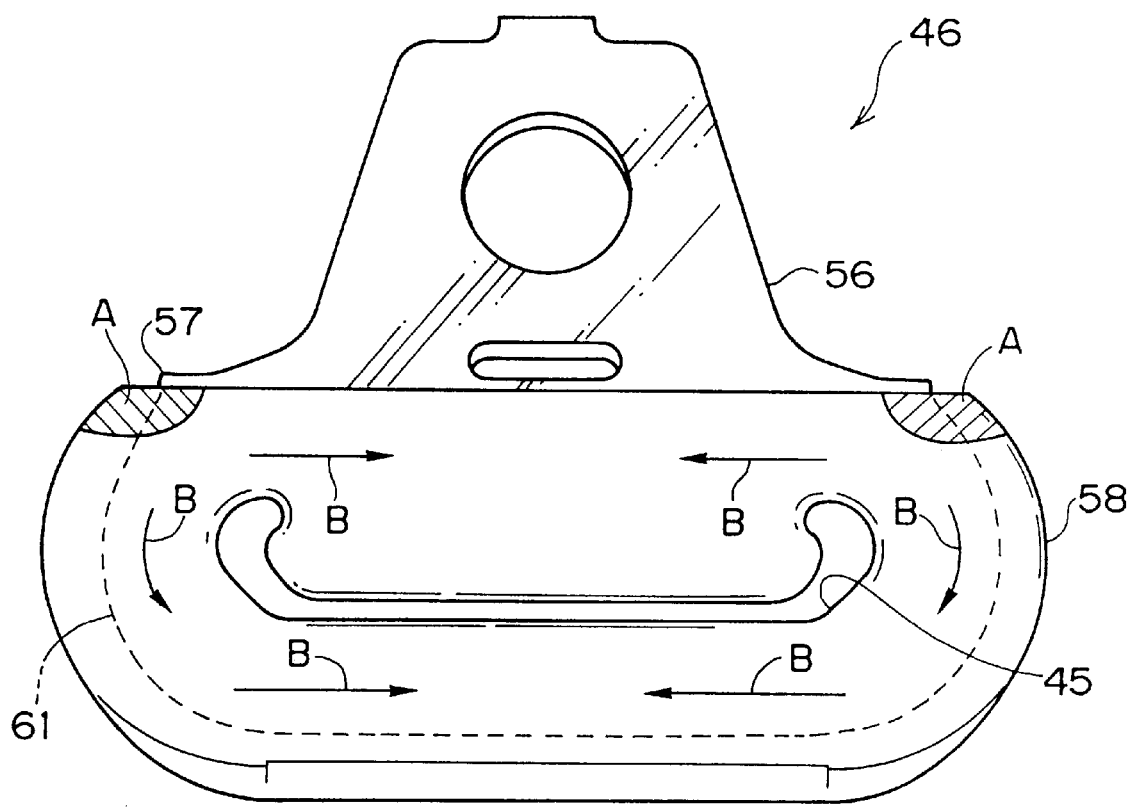
FIG. 6 is a structural diagram of a conventional through anchor.

A webbing insertion hole 20 for folding a webbing 42 pulled out from a retractor 44 shown in FIG. 5 is formed into a slotted hole in the insert portion 18 of the metal plate 12.

Both ends of the webbing insertion hole 20 are curved and formed so that open areas thereof are greater than other portions of the insertion hole, thereby promoting passage of the webbing 42 through the insertion hole in situations where the webbing is forced towards one end of the insertion hole or another and the through anchor 10 turns around.

A notch portion 22 is formed in the vicinity of each shoulder 13 of the metal plate 12. Namely, the notch portions 22 are respectively formed in regions C (at left and right sides on the paper of FIG. 1) in vicinities of both ends of the boundary between the resin molding portion 14 and the exposed portion 15 of the metal plate 12.

Specifically, as illustrated in FIG. 2, the notch portion 22 is formed by three surfaces, i.e., a first inclined surface portion 24 formed so as to extend from an end of an upper surface 26 of the resin molding portion 14 substantially parallel to the outer peripheral portion 23 of the insert portion 18, a bottom surface portion 28 formed so as to extend from an end of the first inclined surface portion 24 substantially parallel to the upper surface 26 of the resin molding portion 14, and a second inclined surface portion 30 formed so as to extend from an end of the bottom surface portion 28 substantially perpendicular to the outer peripheral portion 23 of the metal plate 12.

In this case, the first inclined surface portion 24 and the bottom surface portion 28 are each located at an inner side of the outer peripheral portion 23 of the metal plate 12, and the second inclined surface portion 30 is located at an outer side the outer peripheral portion 23 of the metal plate 12. For this reason, a portion of the outer peripheral portion 23 of the metal plate 12 which is conventionally covered with the resin molding portion is exposed to the outside.

The structure in which the first inclined surface portion 24 is formed substantially parallel to the outer peripheral portion 23 of the metal plate 12 and also formed at the inner side of the outer peripheral portion 23 and the second inclined surface portion 30 is formed substantially perpendicular to the outer peripheral portion 23 of the metal plate 12 is required mainly in the molding process. The metal plate 12 can reliably be held by a metallic mold during the molding, thereby preventing the metal plate 12 from coming out from the metallic mold.

Further, since the second inclined surface portion 30 is formed substantially perpendicular to the outer peripheral portion 23 of the metal plate 12, a width E of a portion of the resin molding portion 14 protruding from the outer peripheral portion 23 is maintained uniformly along the outer peripheral portion 23. As a result, stress concentration caused by irregularities of the width E of the protruded portion is alleviated.

The notch portion 22 is thus formed by the above-described three surfaces, and therefore, as compared with a case of a notch portion formed by two surfaces, an angle of an angular portion formed by the first inclined surface portion 24 and the bottom surface portion 28 and an angle of an angular portion formed by the bottom surface portion 28 and the second inclined surface portion 30 each can be made larger and stress concentration caused in these angular portions can be lessened.

The angular portions of the above-described notch portion 22 may each be rounded, or the notch portion 22 may entirely be formed into a curved surface.

The above-described notch portion 22 indicates a notch portion located at a left side of the through anchor 10 shown in FIG. 2 when seen from the front. Additionally, a notch portion having the same structure as that of the notch portion 22 is formed on a back surface of the metal plate 12 at a position corresponding to the notch portion 22, and further, a notch portion having the same structure as that of the notch portion 22 is formed at a right side of the through anchor 10 shown in FIG. 2 when seen from the front.

When the through anchor 10 having the notch portions 22 is mounted in an adjuster mechanism provided in the interior of a vehicle, a cover is applied to the through anchor 10 so as to cover mainly the exposed portion 15 of the metal plate 12.

Figure 3:
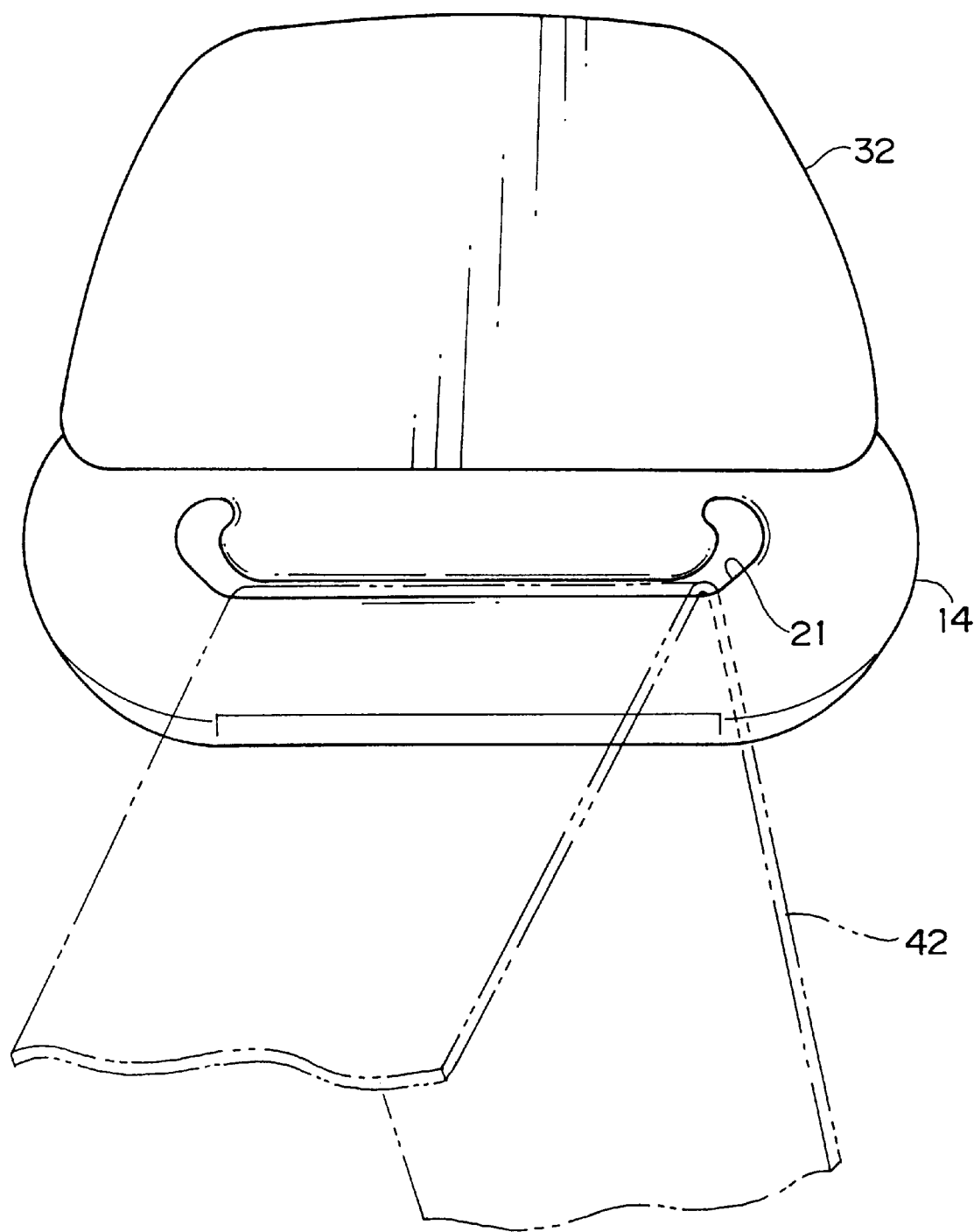
FIG. 3 is a front view which shows a state in which a cover is mounted at the through anchor of the present invention and a webbing is inserted to pass through the through anchor.
Figure 4:
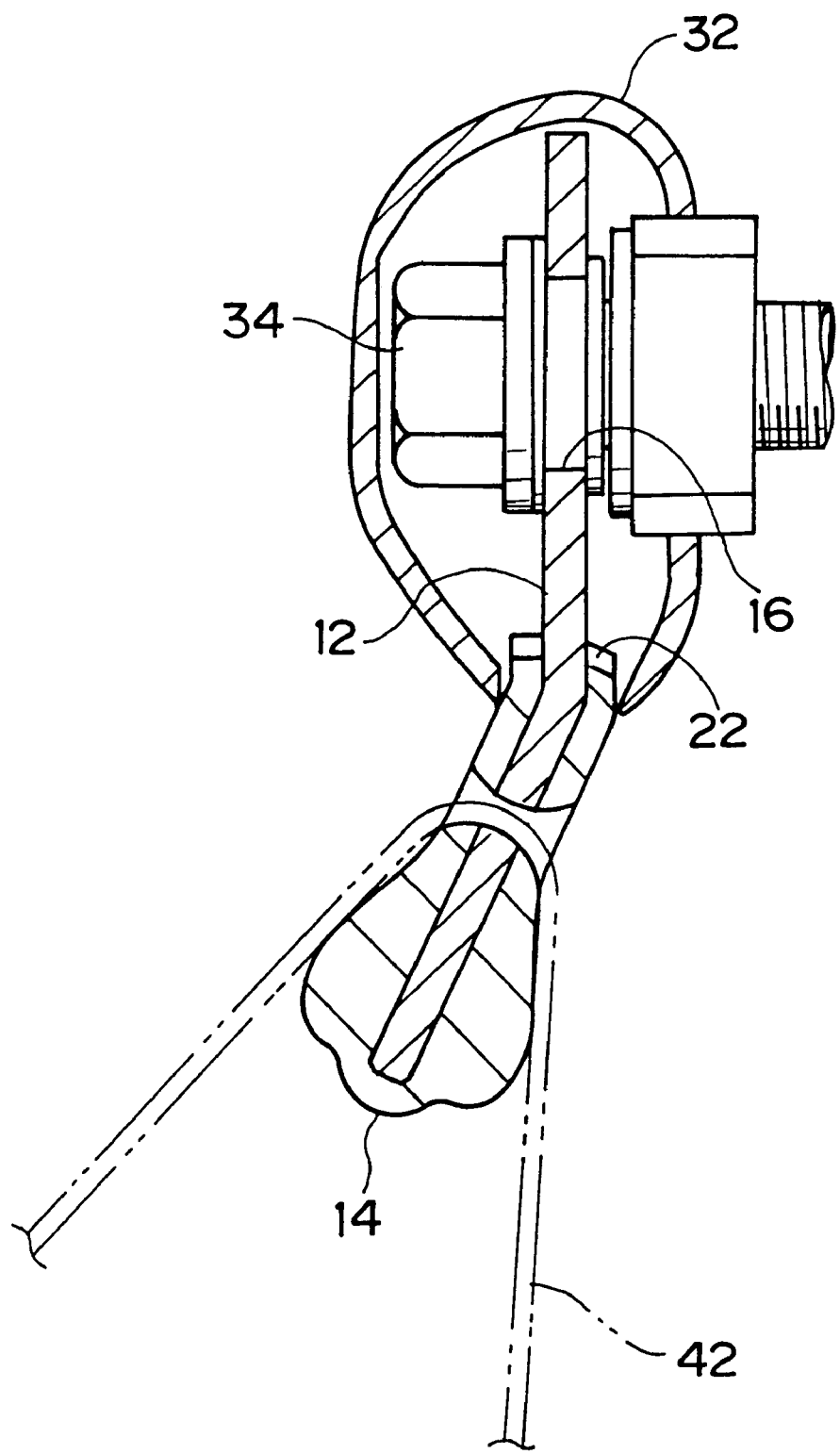
FIG. 4 is a cross sectional view which shows a state in which a cover is mounted at the through anchor of the present invention and a webbing is inserted to pass through the through anchor.

As shown in FIGS. 3 and 4, a cover 32 is applied to the entire exposed portion 15 of the metal plate 12 and also to the upper portion of the resin molding portion 14 in an integrated manner. Particularly, the notch portions 22 formed in the resin molding portion 14 are completely concealed by the cover 32, and the cover 32 therefore functions aesthetically. Further, there it reduces the risk that the notch portions 22 will abut a vehicle occupant, and therefore, the cover 32 has a safety function as well.

Next, construction and operation of the through anchor according to the embodiment of the present invention will be described.

In a manufacturing process of the through anchor 10, first, the insert portion 18 of the metal plate 12 is set in a metallic mold (not shown) which is designed so that the above-described notch portions 22 are formed in the resin molding portion 14.

Next, molten resin is put into the metallic mold. After the resin is cooled down and solidified, the mold is removed. Due to the insert molding, the through anchor 10 shown in FIG. 1 is completed.

The resin molding portion 14 is molten at a high temperature during the resin molding operation, and thereafter, it is cooled down. Accordingly, after the insert molding, the resin molding portion 14 thermally contracts (shrinks) in directions indicated by arrows D1, D2, and D3 in FIG. 2.

At this time, residual stress is generated between the resin molding portion 14 and the insert portion 18 of the metal plate 12 due to the thermal contraction. The residual stress concentrates in both end portions C (see FIG. 1) of the resin molding portion 14 on the boundary between the resin molding portion 14 and the exposed portion 15 of the metal plate 12, thereby maximizing stress concentration in these areas.

The notch portions 22 are formed in the end portions C of the resin molding portion 14, where the residual stress becomes maximum. This residual stress is dispersed by the first inclined surface portion 24, the bottom surface portion 28, and the second inclined surface portion 30, which three surface portions form each notch portion 22.

In this regard, the first inclined surface portion 24 thermally contracts in the direction indicated by arrow Dl. In this case, the thermal contraction of the first inclined surface portion 24 is not retarded by the outer peripheral portion 23 of the metal plate 12 and cracks have less tendency to form in the first inclined surface portion 24. The bottom surface portion 28 thermally contracts in the direction indicated by arrow D1. Similarly, the thermal contraction of the bottom surface portion 28 is not retarded by the outer peripheral portion 23 of the metal plate 12 and cracks have less tendency to form in the bottom surface portion 28. The second inclined surface portion 30 thermally contracts in the direction indicated by arrow D4. In this case, the second inclined surface portion 30 is entirely exposed to the outside of the outer peripheral portion 23 of the metal plate 12, and therefore, the thermal contraction is not retarded by the outer peripheral portion 23 of the metal plate 12. Accordingly, no cracks have less tendency to form in the second inclined surface portion 30 as well.

As described above, in the present embodiment, the notch portion 22 is formed in a region in which residual stress caused by thermal contraction of the resin molding portion 14 concentrates. Stress level of the region in which residual stress concentrates can be reduced by about 40% in the present embodiment. By providing substantially no contact between the resin forming portion 14, and a portion (indicated by slanting lines shown in FIG. 2) of the outer peripheral portion 23 of the metal plate 12, crack formation in the resin molding portion 14 can be effectively reduced.

According to the present invention, dispersion of residual stress can be achieved and crack formation in the resin molding portion can effectively be reduced, without the use of high-strength and high-priced materials.

What is claimed is:

1. A through anchor for a seat belt apparatus for vehicles, by which webbing pulled out from a retractor is folded and held in a slidable manner, comprising:

a metal plate having an insert portion and an exposed portion;

a resin molding portion formed by insert molding and covering the insert portion of said metal plate; and a notch portion formed in said resin molding in vicinities of both ends of a boundary between said resin molding portion and the exposed portion of said metal plate, for dispersing residual stress, which is generated between said resin molding portion and said metal plate due to thermal contraction of said resin molding portion caused after insert molding, wherein the insert portion of said metal plate has an outer peripheral portion and said resin molding portion protrudes beyond the outer peripheral portion by a predetermined amount.

2. A through anchor according to claim 1, wherein said metal plate includes a pair of opposing shoulder portions, and said notch portions create a gap between said shoulder portions and a protruding portion of the resin molding portion.

3. A through anchor according to claim 1, wherein the notch portions are each formed so as to expose a portion in a vicinity of the outer peripheral portion of the insert portion of said metal plate.

4. A through anchor according to claim 1, wherein said metal plate has front and back surfaces and the notch portions are disposed symmetrically on the surfaces.

5. A through anchor according to claim 4, wherein the notch portion is formed by three flat surfaces having different inclinations, with one of the three flat surfaces being substantially perpendicular to the outer peripheral portion of the insert portion of said metal plate.

6. A through anchor according to claim 4, wherein the notch portion is formed by a curved surface.

7. A through anchor according to claim 1, wherein said metal plate has an insertion hole for which the webbing is inserted to pass therethrough, the insertion hole being formed in the insert portion.

8. A through anchor according to claim 7, wherein the insertion hole corresponds to a slot having opposite ends that each curve and have an open area larger than any other portion of the slot.

9. A through anchor according to claim 1, wherein a bolt is used to fix said through anchor to an interior of a vehicle body and the exposed portion has a bolt insertion hole for insertion of a bolt therein.

10. A through anchor for fastening to an interior of a vehicle for supporting seat belt webbing inserted therethrough, the through anchor comprising:

(a) a metal fastening portion including a body section having an outer peripheral edge, and a fastening to the interior of a vehicle; and (b) a resin molding mounted over the body section, the resin molding having a lip extending past the outer peripheral edge of the body section, with notches formed in the lip and exposing at least a part of the outer peripheral edge of the body section within each notch, wherein a slot is defined through the body section and the resin molding for insertion of the seat belt webbing through the slot for supporting the webbing.

11. A through anchor according to claim 10, wherein the body section includes opposite surfaces each joining the outer peripheral edge of the body section, and each notch exposes a part of at least one of the surfaces.

12. A through anchor according to claim 11, wherein the resin molding mounts over both opposite surfaces of the body section, and within each notch, a part of each opposite surface is exposed.

13. A through anchor according to claim 10, wherein each notch includes at least three substantially straight walls.

14. A through anchor according to claim 10, wherein the fastening section includes opposite sides, and each notch is formed proximate to a side of the fastening section.

15. A through anchor according to claim 14, wherein the fastening section includes a rounded corner on each of its said sides, proximate to a notch.

16. A through anchor according to claim 10, wherein the notches extend inward, beyond the outer peripheral edge of the body section.

* * * * *